US010843389B2

(12) United States Patent
Weis et al.

(10) Patent No.: US 10,843,389 B2
(45) Date of Patent: Nov. 24, 2020

(54) MOULDED ARTICLE REINFORCED WITH A REINFORCING ELEMENT, METHOD FOR PRODUCTION THEREOF AND USE THEREOF

(71) Applicant: EMS-PATENT AG, Domat/Ems (CH)

(72) Inventors: Simon Bernhard Weis, Domat/Ems (CH); Christian Kruse, Truebbach (CH); Peter Loch, Flums (CH)

(73) Assignee: EMS-PATENT AG, Domat/Ems (CH)

( * ) Notice: Subject to any disclaimer, the term of this patent is extended or adjusted under 35 U.S.C. 154(b) by 631 days.

(21) Appl. No.: 15/090,881

(22) Filed: Apr. 5, 2016

(65) Prior Publication Data

US 2016/0297123 A1    Oct. 13, 2016

(30) Foreign Application Priority Data

Apr. 7, 2015    (EP) .................................... 15162674

(51) Int. Cl.
*B29C 45/14* (2006.01)
*B29K 101/12* (2006.01)
*B29K 701/12* (2006.01)
*B29K 77/00* (2006.01)
*B29K 105/00* (2006.01)
*B29K 307/04* (2006.01)
*B29K 703/00* (2006.01)

(52) U.S. Cl.
CPC .. *B29C 45/14065* (2013.01); *B29C 45/14631* (2013.01); *B29C 45/14786* (2013.01); *B29C 2045/14114* (2013.01); *B29K 2077/00* (2013.01); *B29K 2101/12* (2013.01); *B29K 2105/0005* (2013.01); *B29K 2307/04* (2013.01); *B29K 2701/12* (2013.01); *B29K 2703/00* (2013.01)

(58) Field of Classification Search
None
See application file for complete search history.

(56) References Cited

U.S. PATENT DOCUMENTS

| | | | | |
|---|---|---|---|---|
| 4,372,800 A | * | 2/1983 | Oizumi | B29C 70/50 156/307.3 |
| 4,655,861 A | * | 4/1987 | Kiss | B27N 3/005 156/62.2 |
| 2003/0124952 A1 | | 7/2003 | Marine | |
| 2010/0009213 A1 | * | 1/2010 | Eipper | H02G 3/088 428/615 |
| 2015/0069657 A1 | | 3/2015 | Hannecart | |

FOREIGN PATENT DOCUMENTS

| | | |
|---|---|---|
| CA | 1 127 469 A | 7/1982 |
| DE | 38 78 672 T2 | 8/1993 |
| DE | 102007037680 A1 | 2/2009 |
| DE | 102011077834 A1 | 12/2012 |
| DE | 102011120986 A1 | 6/2013 |
| EP | 0 872 521 A1 | 10/1998 |
| EP | 2 626 185 A1 | 8/2013 |
| EP | 2 669 082 A1 | 12/2013 |
| EP | 2 725 055 A1 | 4/2014 |
| EP | 3 078 475 B1 | 1/2019 |
| GB | 884468 A | 12/1961 |
| JP | S56-58824 A | 5/1981 |
| JP | 2006-044259 A | 2/2006 |
| JP | 2008-231291 A | 10/2008 |
| WO | WO 2007/008569 A1 | 1/2007 |
| WO | WO 2007/082677 A1 | 7/2007 |
| WO | WO 2008/085312 A1 | 7/2008 |
| WO | WO 2010/139077 A1 | 12/2010 |
| WO | WO 2012/058345 A1 | 5/2012 |
| WO | WO 2013/085723 A1 | 3/2013 |
| WO | WO 2014/118210 A1 | 8/2014 |

OTHER PUBLICATIONS

European Patent Office, Extended Search Report in European Patent Application No. 15 16 2674.4 (dated Oct. 12, 2015).
*Handbook of Plastics Joining*, 2$^{nd}$ Edition, Michael J. Troughton, Editor (2008), p. 148.
China National Intellectual Property Administration, Office Action in Chinese Patent Application No. 201610191153.8 (dated Nov. 14, 2018).
DuPont™ Delrin® acetal resin Molding Guide—Technical Information (2006) 48 pgs.
DIN 53 283 "Bestimmung der Klebfestigkeit von einschnittig überlappten Klebungen (Zugscherversuch)," ("*Determination of the bond strength of single-lap overlapping bonds (tensile shear test)*") (Sep. 1979) 2 pgs.
DIN EN ISO 527-2 "Kunststoffe—Bestimmung der Zugeigenschaftern—Teil 2: Prüfbedingungen für Form- und Extrusionsmassen (ISO 527-2:2012); Deutsche Fassung EN ISO 527-2:2012," ("*Plastics—Determination of tensile characteristics—Part 2: Test conditions for molding and extrusion compounds* (ISO 527-2: 2012); German version EN ISO 527-2: 2012"), (Jul. 1997) 11 pgs.

(Continued)

*Primary Examiner* — Monica A Huson
*Assistant Examiner* — Kelsey C Grace
(74) *Attorney, Agent, or Firm* — Leydig, Voit & Mayer, Ltd.

(57)    ABSTRACT

The invention relates to a method for the production of a moulded article, reinforced with at least one reinforcing element, by means of injection moulding. The reinforcing element is hereby connected integrally to the injection mould wall so that, with subsequent injection moulding of the polymer matrix, the reinforcing element is fixed in the mould. The invention relates likewise to a reinforced moulded article which is producible according to this method. The moulded articles according to the invention are used in the production of automobile parts, industrial and consumer goods and also sports appliances.

15 Claims, No Drawings

(56) References Cited

OTHER PUBLICATIONS

DIN EN ISO 527-5, "Determination of tensile properties of plastics. Part 5: Test conditions for unidirectional fibre-reinforced plastic composites (ISO 527-5: 1997)," (Jul. 1997) 11 pgs.
Durethan BKV30 000000, Data Sheet, LanXess (Sep. 2019) 3 pgs.
Ehrenstein, *Faserverbund-Kunststoffe, Werkstoffe—Verarbeitung—Eigenschaften*, vol. 2 völlig überarbeitete Auflage, ("*Fiber composite plastics, materials—processing—properties,*" vol. 2 completely revised edition) Carl Hanser Verlag, 2006 (pp. 8, 89).
Ehrenstein et al., *Praxis der Thermischen Analyse von Kunststoffen*, 2, Auflage, (*Practice of Thermal Analysis of Plastics, 2nd Edition*) Carl Hanser Verlag, pp. 11, 47, 62f., 77, 82, 224ff (2003).
Gruhn "Production of fittings according to WO 2014/118210 A1," Oct. 29, 2019 (5 pgs.).
Gruhn, Verification of a FE Model of the Damping Properties of TPU as a Media Layer in $MK^2$ Composites using Thermal and Dynamic-Mechanical Analysis, Thesis, Friedrich-Alexander-University, Erlangen-Nürnberg, (Sep. 27, 2008) 89 pgs.
Vestamelt® X1333, Crosslinkable copolyamide hotmelt adhesive, Preliminary product information, Evonik Industries (Feb. 2012) 2 pgs.
"Band (Textil)," (*Band (textile)*), Wikipedia, retrieved Oct. 23, 2019, 2 pgs. https://de.wikipedia.org/w/index.php?title=Band_(Textil)&oldid=177160339.
"Schmelzklebstoff," (*Melt Adhesive*), Wikipedia, retrieved Oct. 24, 2019 (4 pgs.) https://de.wikipedia.org/w/index.php?title=Schmelzklebstoff&oldid=193203924.
"Verbindungstechnik," (*connection technology*), Wikipedia, retrieved Oct. 23, 2019 (4 pgs.) https://de.wikipedia.org/w/index.php?title=Verbindungstechnik&oldid=185903624.
European Patent Office, Notice of Opposition in European Patent Application No. 15162674.4 (dated Nov. 6, 2019).

\* cited by examiner

MOULDED ARTICLE REINFORCED WITH A REINFORCING ELEMENT, METHOD FOR PRODUCTION THEREOF AND USE THEREOF

CROSS-REFERENCE TO A RELATED APPLICATION

This application claims the benefit of European Patent Application No. 15 162 674.4, filed Apr. 7, 2015, the disclosure of which is incorporated herein by reference in its entirety for all purposes.

The invention relates to a method for the production of a moulded article, reinforced with at least one reinforcing element, by means of injection moulding. The reinforcing element is hereby connected integrally to the injection mould wall so that, with subsequent injection moulding of the polymer matrix, the reinforcing element is fixed in the mould. The invention relates likewise to a reinforced moulded article which is producible according to this method. The moulded articles according to the invention are used in the production of automobile parts, industrial and consumer goods and also sports appliances.

Because of the attempt to replace metals with plastic materials, higher and higher requirements are placed on the mechanical properties thereof. One current procedure for improving the mechanical properties resides in the introduction of fibrous reinforcing materials, such as e.g. glass- or carbon fibres, into the plastic material matrix. Components made from a plastic material reinforced in this manner often have however significantly lower rigidities than metal components.

A further improvement can be achieved by selective reinforcement of the moulded articles with fibre ribbons. This is achieved, e.g. by specific application or introduction of these fibre ribbons on or in the moulded article. One of the most important methods for the production of plastic material moulded articles is represented by the injection moulding process. For economic reasons, it is desirable to apply the fibre ribbon or fibre ribbons already in the injection moulding process into the moulded article or onto the latter and not to carry out a separate step subsequently.

However, in particular the problem of reliable and reproducible fixing of the fibre ribbons in the injection mould hereby arises. For fixing the fibre ribbons in the injection mould, various routes have already been described from the state of the art.

From DE 10 2011 077 834 A1, a method for the production of a fibre composite structural part by injection moulding or transfer moulding is known. A semi-finished product is thereby inserted into an injection mould and a fibre-reinforced plastic material is injected after closing the mould. The secure position of the semi-finished product in the mould is thereby ensured by clamping elements.

Another method for the production of injection moulded components reinforced in part with endless fibres is described in DE 10 2007 037 680 A1. A special mould shape is used here, which allows the introduction of needles into the mould shape. With these needles, an endless fibre semi-finished product is positioned in the mould shape before injection of a thermoplastic material. After injection, the needles are retracted.

DE 10 2011 120 986 A1 describes an injection moulding method for manufacturing a fibre composite hollow profile component with moulded-on shaped- and/or functional structures. Firstly, a core is poured hereby in a first mould which then is covered with a fibre material saturated in a duroplastic. In a second mould, this covered core is at least partially hardened and functional or shaped structures are moulded on. After removing the hollow profile from the mould, the core is heated at least to its melting temperature and melted out of the hollow profile.

Starting herefrom, it was the object of the present invention to provide a method for the production of reinforced moulded articles, which allows exact fixing of the reinforcing element and hence makes possible moulded articles with good mechanical properties. There is understood by exact fixing that the reinforcing element is displaced by the injection moulding process by no more than 2 mm, preferably not more than 1 mm, from its initial position. Furthermore, it is the object of the invention to produce exact fixing of the reinforcing element without the complexity of mould modifications or fixing inserts, as are described in the state of the art.

This object is achieved by the method for the production of a reinforced moulded article and the correspondingly reinforced moulded article, both described herein. Uses according to the invention and further advantageous embodiments are also described.

According to the invention, a method for the production of a moulded article reinforced with at least one fibre ribbon is provided, said method having the following steps:
 a) impregnation of an endless, flat roving with a melt of a first thermoplastic polymer to form a fibre ribbon,
 b) application in regions of at least one adhesive on the fibre ribbon with subsequent melting of the at least one adhesive,
 c) cooling and hardening of the fibre ribbon,
 d) heating of an injection mould to a temperature which is not lower than 20 K below the melting point of the adhesive,
 e) introduction of the at least one fibre ribbon into the injection mould, at least one part of the regions of the fibre ribbon which are coated with adhesive being brought in contact with at least one temperature-controlled injection mould wall,
 f) injection moulding of a second thermoplastic polymer into the mould,
 g) removal of the moulded article, reinforced with at least one fibre ribbon, from the injection mould.

According to the invention, the fibre ribbon serves as reinforcing element for the moulded article.

It is thereby preferred that the first thermoplastic polymer used during impregnation in step a) is selected from the group consisting of polyamides, polyolefins, polyacrylates, polycarbonates, polysulphones, polyimides, polyesters, polyethers, polystyrenes or mixtures of one or more of the listed polymers.

It is preferred in addition that the second thermoplastic polymer in step f) is selected from the group consisting of polyamides, polyolefins, polyacrylates, polycarbonates, polysulphones, polyimides, polyesters, polyethers, polystyrenes or mixtures of one or more of the listed polymers.

Preferably, the first thermoplastic polymer used for the impregnation and/or the second thermoplastic polymer used for the overmoulding includes additives. These are preferably selected from the group consisting of inorganic stabilisers, organic stabilisers, lubricants, defoamers, chain-lengthening additives, condensation catalysts, optical brighteners, plasticisers, bonding agents, halogen-containing flame-retardants, halogen-free flame-retardants, impact modifiers, particulate fillers, dyes, pigments and/or mixtures thereof.

In the case of the additives, fibrous fillers are excluded.

The second thermoplastic polymer is fibre-reinforced in a preferred embodiment, preferably it is reinforced with carbon- or glass fibres with a flat or round cross-section. Fibres with a length of 0.1 to 50 mm and a diameter of 5 to 40 μm are hereby preferred. The proportion of reinforcing materials for carbon fibres is of 3 to 50% by weight, preferably 5 to 40% by weight, and for glass fibres, 5 to 75% by weight, preferably of 15 to 65% by weight and particularly preferably of 30 to 50% by weight, respectively relative to the total mass of the second plastic material matrix and of the further additives which are optionally present.

However, it is also possible to use the second thermoplastic polymer in non-reinforced form.

The proportion of additives is preferably 0.1 to 20% by weight and particularly preferably 0.5 to 10% by weight, relative to the total mass of the first and/or second polymer.

The first thermoplastic polymer used for the impregnation and/or the second thermoplastic polymer used for the overmoulding can respectively concern amorphous or partially crystalline polymers. These polymers have a glass transition temperature, measured according to ISO 11357, "half-step-height" method, in the range of 30 to 350° C., preferably in the range of 35 to 230° C., particularly preferably in the range of 40 to 200° C.

In dynamic differential scanning calorimetry (DSC) according to ISO 11357 at a heating rate of 20 K/min, amorphous polymers display a melting heat of at most 5 J/g, preferably of at most 3 J/g, particularly preferably of 0 to 1 J/g.

Amorphous polymers do not display a melting point because of their amorphicity.

If the first thermoplastic polymer used for the impregnation and/or the second thermoplastic polymer used for the overmoulding concern a partially crystalline polymer, it has a melting point, measured according to ISO 11357 specifying the peak maximum as melting point, of 50 to 420° C., preferably of 100 to 350° C. and particularly preferably of 170 to 300° C.

As thermoplastic first and/or second polymer, preferably polyamides are used. The polyamides are thereby obtained preferably from aliphatic or cycloaliphatic diamines and aromatic or aliphatic dicarboxylic acids and/or from lactams. For particular preference, homo- and co-polyamides formed from cycloaliphatic C6-C17 diamines and/or aliphatic C4-C12 diamines with aliphatic C4-C20 dicarboxylic acids and/or aromatic dicarboxylic acids and/or lactams are used. Particularly preferred for the dicarboxylic acids are succinic acid, glutaric acid, adipic acid, pimelic acid, suberic acid, azeleic acid, sebacic acid, undecanedioic acid, dodecanedioic acid, brassylic acid, tetradecanedioic acid, 1,3- and 1,4-cyclohexanedicarboxylic acid, eicosandioic acid, naphthalene dicarboxylic acid, terephthalic acid and isophthalic acid.

Also preferred are polyamides which are formed from the above-mentioned diamines and dicarboxylic acids and/or lactams with 4 to 15 C atoms and/or α,ω-amino acids with 4 to 15 C atoms. Particularly preferred for the diamines are hexamethylene diamine, heptamethylene diamine, octamethylene diamine, nonamethylene diamine, decamethylene diamine, undecamethylene diamine, dodecamethylene diamine, trimethylhexamethylene diamine, 2-methyl-1,5-pentane diamine, isophorone diamine, norbornane diamine, 1,3-bis(aminomethyl)cyclohexane, MACM, MXD, PACM, PXD and TMACM (MACM stands for 3,3'-demethyl-4,4'-diaminocyclohexylmethane, MXD stands for meta-xylylene diamine, PACM stands for 4,4'-diaminocyclohexylmethane, PXD stands for para-xylylene diamine and TMACM stands for 3,3',5,5'-tetramethyl-4,4'-diaminocyclohexylmethane). Further preferred are polyamides made of meta-xylylene diamine and/or hexamethylene diamine and terephthalic acid and/or isophthalic acid.

Preferred amorphous polyamides are selected from the group consisting of PA 6I, PA 6I/6T, PA 6I/6T/6N, PA MXDI/6I, PA MXDI/XDT/6I/6T, PA MXDI/12I, PA MXDI, PA MACM10, PA MACM12, PA MACM14, PA MACM18, PA NDT/INDT, PA TMDC12, PA MACMI/12, PA MACMT/12, PA MACMI/MACM12, PA MACMT/MACM12, PA MACMI/MACMN, PA MACMT/MACMN, PA MACMI/MACM36, PA MACMT/MACM36, PA MACMI/MACMT/12, PA 6I/MACMI/12, PA 6I/6T/MACMI/MACMT, PA 6I/6T/MACMI/MACMT/12, PA MACM6/11, PA 6I/6T/MACMI/MACMT/MACM12/612, PA MACMI/MACMT/MACM12/12, PA MACMI/MACMT/MACM12, PA 6I/6T/6N/MACMI/MACMT/MACMN, PA MACM10/10 and mixtures or copolymers hereof, the MACM being able to be replaced, up to at most 25% by mol, relative to the sum of the molar proportions of all monomers of 100% by mol, by PACM and/or the laurinlactam entirely or partially by caprolactam.

For particular preference, the amorphous polyamide is selected from the group consisting of PA MACM12, PA MACM14, PA MACM12/PACM12, PA MACMI/12 PA MACMI/MACMT/12, PA 6I/6T/MACMI/MACMT/12, PA 6I/6T/MACMI/MACMT/PACMI/PACMT/12, PA MACMI/MACMT/MACM12 and mixtures hereof.

Further preferred are partially crystalline polyamides selected from the group consisting of PA 6, PA 66, PA 69, PA 610, PA 612, PA 11, PA 12, PA 1010, PA 1012, PA 1210, PA 1212, PA PACM12, PA 6/PACMT and mixtures thereof. Particularly preferred are PA 12, PA PACM 12 or mixtures of PA 66 and PA 6I/6T, the PA 6I/6T having the weight ratio of 67/33.

The used spellings and abbreviations for polyamides and the monomers thereof correspond to the ISO standard 1874-1:1992. The spelling PA NDT/INDT for example stands for a polyamide formed from 2,2,4-trimethylhexamethylene diamine, 2,4,4-trimethylhexamethylene diamine and terephthalic acid.

A further preferred embodiment provides that the first polymer used for the impregnation is the same as the second polymer used for the overmoulding, the additives being able however to differ in type and quantity.

The roving consists of endless fibres, also termed filaments in unidirectional arrangement, in particular carbon-, natural-, glass-, mineral- or aramide fibres, preferably carbon fibres or glass fibres with a flat or round cross-section of the individual filament and particularly preferably carbon fibres. During the processing of the roving, i.e. guidance of the roving through a spreading device, the filaments are arranged in a planar fashion so that a flat roving, which is impregnated, results and produces the fibre ribbon.

After impregnation of the flat roving by the first thermoplastic polymer, the proportion of fibres in the fibre ribbon is preferably 1 to 65% by weight, particularly preferably 5 to 50% by weight and in particular preferably 10 to 40% by weight, relative to the total mass of the fibre ribbon.

The impregnation of the flat roving in step a) is effected in such a form that the flat roving present as endless strip is drawn through a heated impregnation station in which the heated and molten first thermoplastic polymer is supplied. At the end of the impregnation, the impregnated flat roving is guided through a rectangular nozzle.

A preferred embodiment provides that application of the at least one adhesive in step b) is implemented by scattering as powder or by applying a suspension or by rolling on a foil or a thread. If application of the adhesive is effected by scattering as powder, then powder grains with grain size ranges of 80 μm to 500 μm are preferred, particularly preferred are 100 μm to 200 μm.

The covering, layer thickness, morphology and adhesion capacity of the at least one adhesive can be adjusted by the applied quantity of adhesive. The quantity of adhesive is thereby preferably in the range of 10 to 50 g/m², particularly preferably of 15 to 30 g/m².

It is likewise possible that the at least one adhesive covers the surface of the fibre ribbon, partially or completely, at discrete points or in geometric patterns, such as stripes, rectangles, diamonds, circles, ovals or in areas in statistical distribution. This can be produced for example with structured reshaping rollers with discontinuous metering or with different sieve inserts between metering and fibre ribbons.

In a preferred embodiment, the adhesive is applied only on one side on the fibre ribbon. In a further preferred embodiment, the adhesive is applied on at least one surface, e.g. on two, three or four surfaces.

In a preferred embodiment, the adhesive is supplied to the fibre ribbon such that the adhesive can be melted on by the heat of the fibre ribbon made available by the impregnation station.

In a further preferred embodiment, it is also possible that the melting-on of the adhesive is produced or assisted by an additional thermal treatment. The thermal treatment of the fibre ribbon can preferably be produced by means of hot air, hot gas, in particular nitrogen, ultrasound, laser and/or irradiation. Infrared radiation is hereby preferred.

Furthermore, it is preferred that the adhesive develops an adhesive effect only when heated to not lower than 20 K below the melting temperature range of the adhesive, preferably only when heated to a temperature within the melting temperature range.

Preferably, the at least one adhesive is selected from the group of copolyamides or copolyesters. There are included herein, in particular copolyamides which have a melting point, measured according to ISO 11357 specifying the peak maximum as melting point, in the range of 70° C. to 160° C., preferably of 90° C. to 140° C. and copolyesters which have a melting point, measured according to ISO 11357 specifying the peak maximum as melting point, in the range of 80° C. to 180° C., preferably of 100° C. to 150° C.

The copolyamides used as adhesive preferably have a melting viscosity, according to ISO 1133, at 160° C. and a loading of 2.16 kg, of 50 to 3,000 Pa*s, preferably 200 to 2,000 Pa*s. The copolyesters used as adhesive preferably have a melting viscosity, according to ISO 1133, at 160° C. and a loading of 2.16 kg, of 50 to 1,500 Pa*s, preferably 100 to 1,000 Pa*s.

Preferably, the copolyamides used for the adhesive are formed from 20 to 80% by mol of caprolactam, 0 to 60% by mol of laurinlactam, 10 to 60% by mol of aliphatic dicarboxylic acids, 0 to 30% by mol of aromatic dicarboxylic acids and at least one diamine, the sum of caprolactam, laurinlactam, aliphatic and aromatic dicarboxylic acid adding up to 100% by mol and the at least one diamine being used in an equivalent molar quantity relative to the sum of the dicarboxylic acids.

Preferably, the copolyesters used for the adhesive are formed from 55 to 95% by mol of aromatic dicarboxylic acids, 5 to 45% by mol of aliphatic dicarboxylic acids and 100% by mol of at least one aliphatic diol, the molar proportions of the dicarboxylic acids adding up to 100% by mol.

The adhesive can comprise one or more of the additives mentioned for the first and/or second polymer.

In a preferred embodiment of the method for the production of a moulded article reinforced with at least one fibre ribbon as reinforcing element, reshaping of the fibre ribbon is effected, before or after step b), by means of a pair of reshaping rollers or a postshaping nozzle in order to be able to reduce the thickness of the fibre ribbon present after step a). By means of this additional reshaping, particularly thin fibre ribbons are producible, i.e. fibre ribbons with a thickness of less than 0.25 mm. In the case of reshaping by means of a pair of reshaping rollers, the shaping rollers are disposed vertically one above the other in one axis. The lower shaping roller is mounted fixed on a shaft which is mounted rotatably. The upper shaping roller is mounted rotatably on a shaft. With a pneumatic cylinder, the upper reshaping roller can be pressed on to the lower reshaping roller at a defined pressure (0-10 bar). In order that the fibre ribbon is retained between the reshaping rollers, there are, on the lower shaft, two jointly running guide rollers which are fitted parallel to the lower reshaping roller and ensure lateral guidance of the reshaping rollers or of the fibre ribbon. During the reshaping by means of a postshaping nozzle, the latter is heated and has the same dimensions as the fibre ribbon to be produced.

After cooling and hardening of the fibre ribbon, this has a thickness of 0.02 to 5 mm, preferably 0.15 to 4 mm, particularly preferably 0.2 to 2 mm, very particularly preferably 0.25 to 1.0 mm. The width of the fibre ribbons is preferably of 1 to 40 mm, preferably of 2 to 30 mm and particularly preferably of 5 to 20 mm.

Furthermore, it is preferred that, after cooling and hardening of the fibre ribbon, this can be separated into partial pieces. This can be effected in particular by cutting, laser treatment, squeezing, sawing, water jets, bending or combinations of these measures.

However, it is also possible, in a further embodiment, firstly not to implement a separation step and to wind the fibre ribbon as an endless band on a bobbin after cooling and hardening. In this case, separation of the endless band is effected in lengths suitable for the moulded article to be reinforced in a further step.

A further preferred embodiment provides that the fibre ribbon present as endless band is supplied continuously to an injection mould, the fibre ribbon being introduced in regions into the injection mould and division of the endless band being effected only after the injection moulding process.

Introduction of the fibre ribbon into the injection mould can be implemented both manually and automatically. For this purpose, handling systems with a gripper, vacuum nozzles or pins can be used.

The handling system can be controlled automatically and/or by computer control.

A further preferred embodiment provides that, in step d), the injection mould is heated to a temperature which is not lower than 20 K below the melting point of the adhesive, in particular at 50 to 200° C., preferably at 70 to 180° C., particularly preferably at 90 to 160° C. The combination of adhesive and second thermoplastic polymer should hereby be chosen such that it is processible at the mentioned mould temperatures.

In step e), the at least one fibre ribbon can thereby be brought in contact with the at least one temperature-controlled injection mould wall, preferably by applying a pressure of 5 to 30 N/cm², preferably of 10 to 20 N/cm².

Adhesion of the fibre ribbon is effected preferably on a mould wall without structuring. However, it is also possible to give the mould wall a surface structuring at the regions where the adhesion is effected, in patterns of depressions in the form of grooves, channels, dimples, pyramids or the like.

In a further embodiment, a further step can be provided between the impregnation step a) and application of the adhesive in step b), in which further step at least 2 fibre ribbons are joined to form a laminate. Application of the adhesive is thereby effected, in step b), on at least one side of the laminate produced in the laminating step.

According to the invention, a reinforced moulded article which is producible according to the previously described method is likewise provided. In addition to precise fixing of the reinforcing insert, the moulded article has further positive properties which extend beyond the solutions present in the state of the art. Thus, the layer of adhesive remaining on the outside wall of the moulded article after conclusion of the injection moulding process increases protection against stress concentration of the fibres of the reinforcing insert. Likewise, it is possible to add a UV stabiliser to the adhesive and hence to protect the layer of the matrix polymer of the reinforcing insert, situated thereunder, from degradation without requiring to change the constituents of this matrix polymer themselves. Likewise, by choice of a suitable profiling or grooving of the mould surface, structuring can be given to the layer of adhesive remaining on the moulded article. Consequently, it is possible to provide a particular aesthetic or haptic appearance also at the position of the reinforcing insert, which otherwise would make further surface machining steps necessary.

The previously described reinforced moulded articles are used for the production of automobile parts, in particular chassis components, structural components, armrests, seat shells, coupling struts, engine mountings, fans, lamellae, interior parts, exterior parts, transmission components and wheel rims; and also industrial and consumer goods, in particular levers, pressurised containers, tool parts, household appliances, sanitary components, fixings, garden appliances, sports appliances, in particular shoes, bows, ice picks, rackets, bicycle frames, pedals, helmets and protectors.

The subject according to the invention is extended to be explained in more detail with reference to the subsequent examples without wishing to restrict said subject to the specific embodiments shown here.

Materials Used:
Fibre Ribbons

For the production of the fibre ribbons used, endless carbon fibres CF ROVING T700SC-12K-50C of the company Toray with 7 μm filament diameter and a 1% epoxy sizing were used.

The first polymer used for the impregnation comprises polyamide 66 with 62% by weight, polyamide 6I/6T (67/33) with 32% by weight, impact modifier with 4% by weight and further additives with 2% by weight.

The fibre ribbon has the following properties:
Modulus of elasticity in tension: 49,400 MPa
Breaking stress: 750 MPa
Breaking elongation: 1.5%
Fibre proportion (mass): 30%
Fibre proportion (volume): 21%
Density: 1.28 g/cm$^3$
Melting temperature: 260° C.

For the tests, fibre ribbons with the following 3 dimensions (length×width×thickness in mm) were produced: 50×10×0.35 and 100×10×0.35 and also 160×10×0.35.

Adhesives

Adhesive A comprises lactam 6 37.6% by mol, lactam 12 50.2% by mol, adipic acid 12.2% by mol, hexamethylene diamine 12.2% by mol. The melting point thereof is 125° C.

Adhesive B comprises lactam 6 60.0% by mol, adipic acid 10.0% by mol, sebacic acid 20.0% by mol, dodecanedioic acid 10.0% by mol, hexamethylene diamine 40.0% by mol. The melting point thereof is 110° C.

Second Polymer/Injection Moulding Polymer

As second polymers used for the overmoulding, there were used for the tests:

A polymer C, comprising polyamide 66 with 35% by weight, polyamide 6I/6T (67/33) with 12% by weight, glass fibres with 50% by weight, impact modifier with 2% by weight and further additives with 1% by weight.

A polymer D, comprising 20% by weight of terephthalic acid, 8% by weight of isophthalic acid, 20% by weight of hexamethylene diamine, 50% by weight of glass fibres and 2% by weight of further additives.

Production of the Test Pieces/Injection Moulding Conditions

The test pieces of the tests were injection moulded on an injection moulding machine Allrounder 370S of the company Arburg. The screw diameter was 20 mm with screw nozzle. Locking pressure at most 700 kN. Plastifying unit Standard 3 zone screw.

The following injection moulding parameters were set:

| Parameters | Unit | Polymer C | Polymer D |
| --- | --- | --- | --- |
| screw speed | [1/min] | 150 | 150 |
| metering path/decompression | [mm] | 86/5 | 98/2 |
| switching pressure specific | [bar] | 990 | 650 |
| max. injection pressure | [bar] | 1,130 | 960 |
| injection speed | [mm/s] | 100 | 100 |
| injection time | [s] | 0.81 | 0.80 |
| dwell pressure | [bar] | 800 | 800 |
| dwell pressure time | [s] | 17 | 17 |
| residual cooling time | [s] | 20 | 20 |
| mould temperature | [° C.] | 120 | 140 |
| compound temperature | [° C.] | 310 | 350 |

Tests
Tensile Test According to DIN EN ISO 527

Tensile strengths of the test pieces were measured according to DIN EN ISO 527 with a tension-elongation machine (Universal testing machine Z100, manufacturer: Zwick/Roell). Initial spacing of the clamps with the injection moulded test pieces was 115 mm. The transverse speed was 5 mm/min. Measurement of the tensile elongaton is effected via two grippers. The test pieces used concerned ISO test pieces, standard: ISO/CD 3167, type A1, 170×20/10×4 mm. The dimension of the fibre ribbons introduced therein was 160×10×0.35 mm [L×W×H].

Tensile Shear Text

Following DIN 53 283, tensile shear tests relating to increasing the adhesive strength were implemented on a temperature-controlled surface. The adhesive surface ([L×W] 50×10/100×10 mm), the type of adhesive (adhesive A, adhesive B), the quantity of adhesive (15 g/m$^2$/30 g/m$^2$/40 g/m$^2$) and the surface temperature (120° C./140° C.) was thereby varied. The withdrawal speed was 100 mm/min.

Offset Measurement

The offset measurement was implemented with a Leica M420 macroscope and IM 1000 image processing software. The fibre ribbon was hereby glued into the cavity on the ejection side of the mould. For measurement of the offset, the ejection pin was set as reference point for the zero line. After the injection moulding process, the offset of the fibre ribbon relative to the impression of the ejection pin on the tensile test piece was measured.

TABLE 1

| Examples | E1 | E2 | E3 | E4 | E5 | E6 | E7 | E8 | E9 | E10 | E11 | CE1 | CE2 |
|---|---|---|---|---|---|---|---|---|---|---|---|---|---|
| Quantity of adhesive A [g/m$^2$] | 15 | 30 | 45 | 30 | 0 | 0 | 0 | 30 | 30 | 0 | 30 | n.a | 0 |
| Quantity of adhesive B [g/m$^2$] | 0 | 0 | 0 | 0 | 30 | 45 | 30 | 0 | 0 | 30 | 0 | n.a | 0 |
| Mould temperature during adhesion [° C.] | 120 | 120 | 120 | 120 | 120 | 120 | 120 | 140 | 120 | 120 | 140 | n.a | 100 |
| Adhesive on surfaces of the fibre ribbon on one side/on both sides | on one side | on one side | on one side | on one side | on one side | on one side | on one side | on one side | on both sides | on both sides | on one side | n.a. | on one side |
| Injection moulding polymer used | Polymer C | Polymer C | Polymer C | Polymer C | Polymer C | Polymer C | Polymer C | Polymer C | Polymer C | Polymer C | Polymer C | Polymer C | Polymer C |
| Tensile shear strength [N], length fibre ribbon 50 mm | 2.3 | 4.0 | 7.3 | — | 4.0 | 5.3 | — | 3.3 | — | — | — | — | — |
| Tensile shear strength [N], length fibre ribbon 100 mm | — | — | — | 8.3 | — | — | 7.5 | — | — | — | — | — | — |
| Tensile test-tensile strength [N/mm$^2$], length fibre ribbon 160 mm | — | 323.1 | — | — | 325.1 | — | — | — | 272.4 | 296 | 289.1 | 256 | 247.3 |
| Measurement-offset [mm] | 0.85 | 0.61 | 1.88 | 0.54 | 0.69 | 0.83 | 0.72 | — | 1.17 | 0.78 | 1.67 | | 21.42 |

Measurement not ascertained; n.a. no fixing by adhesion; CE1 non-reinforced moulded article, CE2 reinforced moulded article with eccentric fibre ribbon.

The examples according to the invention show that the reinforcing inserts introduced by means of adhesion maintain their precise orientation in the mould despite high melt pressures.

Correspondingly, the examples according to the invention have higher tensile strengths than the moulded articles with non-fixed insert in CE2 which are deflected out of their position under the influence of the melt and can no longer transmit force flows correctly. Likewise, the achieved tensile strengths of the examples according to the invention are higher than the non-reinforced moulded articles in CE1.

Furthermore, examples E1-E7 and E9-11 show that the offset of the reinforcing insert extends predominantly in the μm range and hence the most precise reinforcements are possible. Furthermore, examples E1-E11 show the suitability of the adhesive fixing under various boundary conditions. Examples E1-E7 show that the lowest offset values can be achieved with moderate quantities of adhesive around 30 g/m$^2$. Examples E9-E10 show that, also in the case of application of the adhesive on both sides, high tensile strengths are achieved, the moulded article therefore does not delaminate.

The invention claimed is:

1. A method for producing a moulded article reinforced with at least one fibre ribbon, comprising:
    a) impregnating an endless, flat roving with a melt of a first thermoplastic polymer to form an impregnated fibre ribbon having two opposing sides,
    b) applying in regions of at least one adhesive on only one of the two opposing sides the impregnated fibre ribbon with subsequent melting of the at least one adhesive,
    c) cooling and hardening of the impregnated fibre ribbon applied with the at least one adhesive,
    d) heating an injection mould to a temperature which is not lower than 20 K below the melting point of the adhesive,
    e) introducing the impregnated fibre ribbon from c) into the injection mould such that at least one part of the regions of the impregnated fibre ribbon coated on one side with the at least one adhesive is brought in contact with at least one temperature-controlled injection mould wall and the adhesive coated side adheres to the wall of the injection mould such that the impregnated fibre ribbon is fixed to the wall of the injection mould by the adhesive,
    f) injection moulding a second thermoplastic polymer into the mould such that the second thermoplastic polymer adheres to the side of the impregnated fibre ribbon that has not been applied at least one adhesive, to obtain a reinforced moulded article, and
    g) removing the reinforced moulded article from the injection mould.

2. The method according to claim 1, wherein the first thermoplastic polymer is selected from the group consisting of polyamides, polyolefins, polyacrylates, polycarbonates, polysulphones, polyimides, polyesters, polyethers, polystyrenes, and mixtures thereof.

3. The method according to claim 1, wherein the second thermoplastic polymer is selected from the group consisting of polyamides, polyolefins, polyacrylates, polycarbonates, polysulphones, polyimides, polyesters, polyethers, polystyrenes, and mixtures thereof.

4. The method according to claim 2,
wherein, in step a) and/or f), the first thermoplastic polymer and/or the second thermoplastic polymer is utilized in combination with one or more additives selected from the group consisting of inorganic stabilisers, organic stabilisers, lubricants, defoamers, chain-lengthening additives, condensation catalysts, optical brighteners, plasticisers, bonding agents, halogen-containing flame-retardants, halogen-free flame-retardants, impact modifiers, particulate fillers, dyes, pigments, and mixtures thereof.

5. The method according to claim 1,
wherein the at least one adhesive in step b) is applied by scattering as powder, applied as suspension, or applied by rolling on as foil or thread.

6. The method according to claim 1,
wherein the adhesive develops an adhesive effect only when heated to not lower than 20 K below the melting point of the adhesive.

7. The method according to claim 1,
wherein the at least one adhesive covers the surface of the fibre ribbon, partially or completely, at discrete points or in geometric patterns, or in areas in statistical distribution.

8. The method according to claim 1,
wherein the at least one adhesive is selected from the group of copolyamides and copolyesters.

9. The method according to claim 8,
wherein the copolyamide has a melting point, according to ISO 11357, in the range of 70° C. to 160° C., and/or a melting viscosity at 160° C. and a loading of 2.16 kg, according to ISO 1133, of 50 to 3,000 Pa*s, and/or in that the copolyester has a melting point, according to ISO 11357, in the range of 80° C. to 180° C., and/or a melting viscosity, according to ISO 1133, at 160° C. and a loading of 2.16 kg, of 50 to 1.500 Pa*s.

10. The method according to claim 1,
wherein the covering, layer thickness, morphology, and the adhesion capacity of the at least one adhesive is adjusted by the applied quantity of adhesive.

11. The method according to claim 1,
wherein reshaping of the fibre ribbon is effected before or after step b).

12. The method according to claim 1,
wherein, in step e), the injection mould is heated to a temperature which is not lower than 20 K below the melting temperature of the adhesive.

13. The method according to claim 1,
wherein, in step e), the at least one fibre ribbon is brought in contact with the at least one temperature-controlled injection mould wall by applying a pressure of 5 to 30 N/cm$^2$.

14. The method according to claim 1,
wherein the roving consists of endless fibres, carbon-, natural-, glass-, mineral- or aramide fibres, with a flat or round cross-section of the individual filament.

15. The method according to claim 1,
wherein, between the impregnation step a) and application of the adhesive in step b), at least 2 fibre ribbons are joined to form a laminate in a further station and application of the adhesive is effected, in step b), on at least one side of the laminate.

* * * * *